Nov. 14, 1967 A. J. McCOLGAN 3,352,214
METHOD OF MAKING CONTAINERS
Filed May 10, 1965
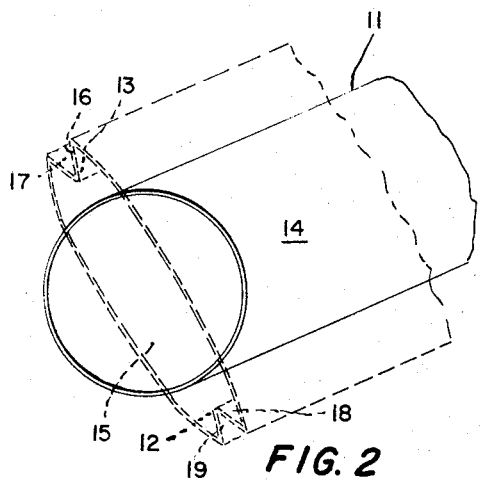
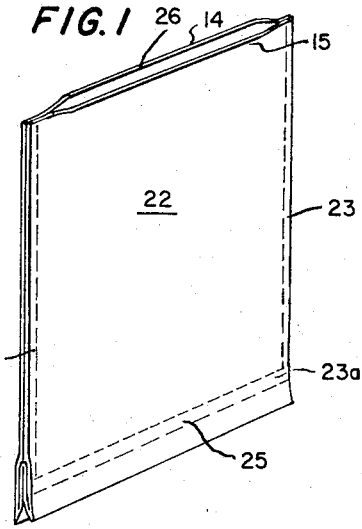
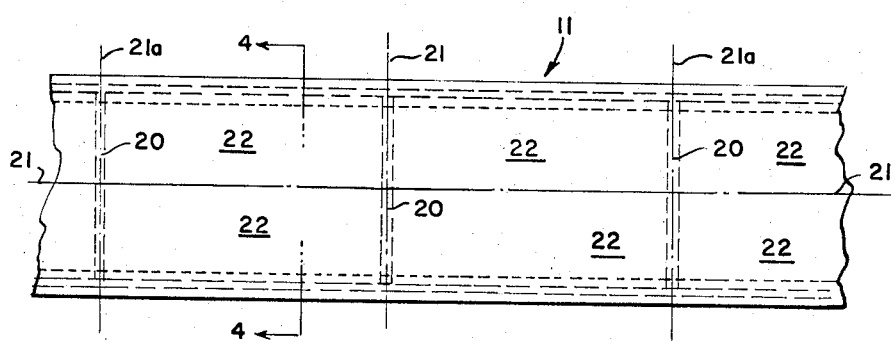
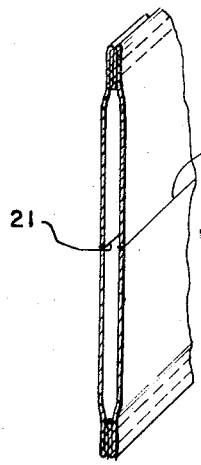
INVENTOR.
A. J. McCOLGAN
BY
ATTORNEY 3,352,214
METHOD OF MAKING CONTAINERS
Arnold J. McColgan, Pointe Claire, Quebec, Canada, assignor to W. Ralston & Co. (Canada) Ltd., Montreal, Quebec, Canada, a corporation of Canada
Filed May 10, 1965, Ser. No. 454,608
3 Claims. (Cl. 93—35)

ABSTRACT OF THE DISCLOSURE

A method of making containers is shown having the method steps of inturning the opposite lateral portions of a tube of container forming material, sealing the inturned portions to one another, sealing the top face to the bottom face of the tube at spaced portions extending across the tubular member in one direction and cutting the tubular member transversely and longitudinally so as to form a plurality of separate containers with each of the containers having a reinforced edge portion.

Description of the invention

This invention relates to a method of making containers, principally those made of heat-sealable thermoplastic material.

The method of this invention is particularly advantageous in the production of containers which are initially closed on three sides and open on one side. This type of container is generally filled with merchandise through the open side and then the open side is heat sealed into closed position.

The method of this invention also produces containers which bear an inturned portion. This strengthens the containers and permits application of shearing forces along the said inturned portion without rupturing the container. Such a container, if produced by the conventional processes heretofore available, would be quite expensive to manufacture.

The above constitutes a brief description of this invention and the objects and advantages thereof. Further objects and advantages could obviously be made within the spirit and scope of this invention and would occur to those skilled in this art.

The invention will now be further described by reference to the accompanying drawings which are made a part of this specification.

FIG. 1 is a perspective view of one form of a container made in accordance with this invention.

FIG. 2 is a view of the tubular element out of which the containers of this invention are formed with the shape of the element as it is being worked upon to form a plurality of containers indicated in phantom lines.

FIG. 3 is a plan somewhat diagrammatic view of the tubular element in the form that it assumes as it is worked upon according to the method of this invention.

FIG. 4 is a sectional view of the element shown in FIG. 3 taken along lines 4—4 of FIG. 3.

The invention will be further described by reference to the form thereof shown in the accompanying drawings. In this connection, however, the reader is informed that the specific forms of this invention as set forth in the specification herein is for illustrative purposes and for purposes of example only. Various changes and modifications may obviously be made within the spirit and scope of this invention and would occur to those skilled in this art.

Now referring specifically to the drawings a tubular member 11 is flattened as shown in FIG. 2 so as to form a top face 14 and a bottom face 15. Opposite lateral portions 12 and 13 are inturned so as to form a plurality of spaced sides 16 and 17 on portion 13 and 18 and 19 on portion 12. Portions 16 and 17 and portions 18 and 19 are heat-sealed to one another as tubular member 11 passes through the bag-making machine so as to form a construction diagrammatically shown in FIG. 3. Also as tubular member 11 passes through the bag-making machine it is cut longitudinally along line 21 by a knife member (not shown). As tubular member 11 passes through the bag-making machine a heat sealing device including a transversely disposed knife is brought down upon tubular member 11 periodically so as to form linear transverse sealed portions 20 at spaced intervals along tubular member 11. Also the transversely disposed knife cuts sections from tubular member 11 along line 21a.

As a result of this process a plurality of containers 22 are formed which have three closed sides 23, 24 and 25 and one open side 26. Side 25 is furthermore reinforced at 23a which portion corresponds to the portion originally formed longitudinally by heat-sealing sides 18 and 19 or 16 and 17 to one another. The container may now be filled with various types of merchandise and faces 14 and 15 heat-sealed to one another along the open top of the container so as to seal the container and permit it to be utilized to protect various items of merchandise.

In the preferred modification of this invention the material of which the tubular member is composed is polyethylene or polypropylene or other similar heat-sealable thermoplastic material.

The foregoing sets forth the manner in which the objects of this invention are achieved.

I claim:
1. A method of making containers comprising the steps of inturning opposite lateral portions of a tubular member having a top face and a bottom face, sealing said inturned portions to one another, sealing said top face to said bottom face across spaced portions extending in one direction across said tubular member, and cutting said tubular member transversely and longitudinally so as to form a plurality of separate containers each having a reinforced edge portion.

2. A method of making containers formed entirely of thermoplastic material comprising the steps of inturning opposite lateral portions of a tubular member having a top face and a bottom face, heat sealing the sides of said inturned portions to one another, cutting said tubular member longitudinally, heat sealing said top face to said bottom face along spaced linear transverse portions of said tubular member and cutting said tubular member in a transverse direction so as to form a plurality of separate containers each closed on three sides and open on one side having a reinforced edge portion on the side opposite said open side.

3. A method of making containers formed entirely of thermoplastic material comprising the steps of gusseting opposite lateral portions of a tubular member having a top face and a bottom face, heat sealing the sides of said inturned portions to one another, cutting said tubular member longitudinally, heat sealing said top face of said tubular member to said bottom face thereof along spaced linear transverse portions, and cutting said tubular member in a transverse direction so as to form a plurality of separate containers each closed on three sides and open on one side having a reinforced edge portion on the side opposite said open side.

References Cited

UNITED STATES PATENTS

| | | | |
|---|---|---|---|
| 2,265,075 | 12/1941 | Knuetter | 93—35 |
| 2,444,685 | 7/1948 | Waters | 93—18 |
| 3,194,124 | 7/1965 | Warp | 93—35 |

GERALD A. DOST, *Primary Examiner.*